US011362980B2

(12) United States Patent
Cudak et al.

(10) Patent No.: US 11,362,980 B2
(45) Date of Patent: Jun. 14, 2022

(54) SENDING MESSAGES TO AN UNAVAILABLE DEVICE

(71) Applicant: LENOVO Enterprise Solutions (Singapore) PTE. LTD., New Tech Park (SG)

(72) Inventors: Gary D. Cudak, Wake Forest, NC (US); Srihari V. Angaluri, Raleigh, NC (US); Ajay Dholakia, Cary, NC (US); Jarrod B. Johnson, Raleigh, NC (US); Bryan L. Young, Tualatin, OR (US)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 705 days.

(21) Appl. No.: 15/240,616

(22) Filed: Aug. 18, 2016

(65) Prior Publication Data
US 2018/0054407 A1 Feb. 22, 2018

(51) Int. Cl.
*H04L 12/58* (2006.01)
*H04L 51/18* (2022.01)
*H04L 51/043* (2022.01)
*H04L 51/00* (2022.01)
*H04L 51/224* (2022.01)

(52) U.S. Cl.
CPC ............ *H04L 51/18* (2013.01); *H04L 51/043* (2013.01); *H04L 51/14* (2013.01); *H04L 51/24* (2013.01)

(58) Field of Classification Search
CPC ......... H04L 51/18; H04L 51/24; H04L 51/14; H04L 51/043
See application file for complete search history.

(56) References Cited

U.S. PATENT DOCUMENTS

| 8,422,646 | B2* | 4/2013 | Gray | H04L 51/043 |
| | | | | 379/88.22 |
| 2003/0105821 | A1* | 6/2003 | Shah | H04L 51/14 |
| | | | | 709/206 |
| 2007/0299927 | A1* | 12/2007 | Knauerhase | H04L 51/04 |
| | | | | 709/206 |

(Continued)

OTHER PUBLICATIONS

Enterprise Service Bus,Guaranteed Delivery with Failover Message Store and Scheduled Failover Message Forwarding Processor, https://docs.wso2.com/display/ESB490/gUARANTEED+Delivery+with+Failover+Message+Store+and+Scheduled+Failover+Message+Forwarding+Processor, Last Visited Jun. 9, 2016.

(Continued)

*Primary Examiner* — Abdullahi E Salad
(74) *Attorney, Agent, or Firm* — Kunzler Bean & Adamson; Bruce R. Needham (57) ABSTRACT

An apparatus, system, method, and program product are disclosed for sending messages to an unavailable device. The apparatus includes a status module that determines that a recipient device for a message is unavailable to receive the message. The apparatus includes a message module that sends the message to an intermediate device for storage until the recipient device is available to receive the message in response to determining that the recipient device is unavailable to receive the message. The apparatus includes a notification module that sends a notification to the recipient device that the message is available to access from the intermediate device.

18 Claims, 6 Drawing Sheets

(56) References Cited

U.S. PATENT DOCUMENTS

| | | | | |
|---|---|---|---|---|
| 2010/0318617 A1* | 12/2010 | Rault | ............... | H04L 51/04 |
| | | | | 709/206 |
| 2012/0060100 A1* | 3/2012 | Sherwood | ......... | H04N 21/4122 |
| | | | | 715/748 |
| 2014/0171024 A1* | 6/2014 | Huang | ............... | H04W 4/12 |
| | | | | 455/411 |
| 2015/0195234 A1* | 7/2015 | Bell | ............... | H04L 51/12 |
| | | | | 709/206 |
| 2015/0373515 A1* | 12/2015 | Appelman | ............ | H04L 51/04 |
| | | | | 709/206 |
| 2016/0028799 A1* | 1/2016 | Kallman | ............ | G06Q 10/107 |
| | | | | 709/206 |
| 2016/0150386 A1* | 5/2016 | Appelman | ............ | H04L 51/14 |
| | | | | 455/466 |
| 2016/0380947 A1* | 12/2016 | Lee | ............... | H04L 51/14 |
| | | | | 709/206 |
| 2017/0104698 A1* | 4/2017 | Tomczyk | ............... | H04L 51/04 |

OTHER PUBLICATIONS

Massive Latency Compensation, Promise Pipelining, http://erights.org/elib/distrib/pipeline.html, Last Visited Jun. 9, 2016.
Sandstorm.io, Cap'n Proto, https://capnproto.org/rpc.html, Last Visited Jun. 9, 2016.

* cited by examiner

SENDING MESSAGES TO AN UNAVAILABLE DEVICE

FIELD

The subject matter disclosed herein relates to transmission of electronic messages and more particularly relates to transmitting electronic messages to an unavailable device.

BACKGROUND

Devices can send electronic messages to other devices as part of operating in a networked environment. For instance, devices in a data center may send messages to each other that include storage information, user information, or the like. Sending and receiving messages can consume processor cycles and decrease the performance of a device. For example, a sender may be held up waiting to send and/or confirm receipt of an electronic message sent to an unavailable recipient.

BRIEF SUMMARY

An apparatus for sending messages to an unavailable device is disclosed. A method and computer program product also perform the functions of the apparatus. The apparatus includes a status module that determines that a recipient device for a message is unavailable to receive the message. The apparatus includes a message module that sends the message to an intermediate device for storage until the recipient device is available to receive the message in response to determining that the recipient device is unavailable to receive the message. The apparatus includes a notification module that sends a notification to the recipient device that the message is available to access from the intermediate device.

In one embodiment, the status module determines that the recipient device is unavailable in response to sending the message to the recipient device and not receiving a reply. In another embodiment, the status module determines that the recipient device is unavailable based on one or more characteristics of the recipient device. In another embodiment, the one or more characteristics include a utilization level of the recipient device satisfying a predetermined utilization threshold, a used capacity of a message buffer of the recipient device satisfying a predetermined buffer capacity, a health status of the recipient device satisfying predetermined health threshold, and/or a network status of the recipient device satisfying a predetermined network threshold.

In one embodiment, the status module determines that the recipient device is unavailable to receive the message in response to determining that a network connection to the intermediate device is faster than a network connection to the recipient device. In another embodiment, the apparatus includes a device module that selects the intermediate device in response to determining that a service for receiving, storing, and transmitting messages to the recipient device is available on the intermediate device, determining that one or more characteristics of the intermediate device satisfies one or more predefined requirements, and/or determining that the intermediate device is on a list of predetermined intermediate devices.

In one embodiment, the apparatus includes a storage module that stores the received message in a storage location on the intermediate device that is accessible to the recipient device. In a further embodiment, the storage location includes a directory that is determined based on a unique identifier for a device that the message is sent from and/or information included in one or more headers of the message. In another embodiment, the notification module periodically sends the notification to the recipient device at predetermined intervals while the message is available to access from the intermediate device.

In one embodiment, the notification includes a location of the intermediate device, an identifier for the intermediate device, and/or a storage location for the message on the intermediate device. In another embodiment, the apparatus includes a cleanup module that deletes the message from the intermediate device in response to expiration of a predefined amount of time, receiving a cleanup command, and/or the recipient device accessing the message.

A method includes determining that a recipient device for a message is unavailable to receive the message. The method includes sending the message to an intermediate device for storage until the recipient device is available to receive the message in response to determining that the recipient device is unavailable to receive the message. The method includes sending a notification to the recipient device that the message is available to access from the intermediate device.

In one embodiment, determining that the recipient device is unavailable includes sending the message to the recipient device and not receiving a reply. In another embodiment, the method includes determining that the recipient device is unavailable based on one or more characteristics of the recipient device. In certain embodiments, the one or more characteristics include a utilization level of the recipient device satisfying a predetermined utilization threshold, a used capacity of a message buffer of the recipient device satisfying a predetermined buffer capacity, a health status of the recipient device satisfying predetermined health threshold, and/or a network status of the recipient device satisfying a predetermined network threshold.

In one embodiment, the method includes determining that the recipient device is unavailable to receive the message in response to determining that a network connection to the intermediate device is faster than a network connection to the recipient device. In another embodiment, the method includes selecting the intermediate device in response to determining that a service for receiving, storing, and transmitting messages to the recipient device is available on the intermediate device, determining that one or more characteristics of the intermediate device satisfies one or more predefined requirements, and/or determining that the intermediate device is on a list of predetermined intermediate device.

In another embodiment, the method includes storing the received message in a storage location on the intermediate device that is accessible to the recipient device. In another embodiment, the storage location includes a directory determined based on a unique identifier for a device that the message is sent from and/or information included in one or more headers of the message.

In one embodiment, the method includes periodically sending the notification to the recipient device at predetermined intervals while the message is available to access from the intermediate device. In another embodiment, the notification includes a location of the intermediate device, an identifier for the intermediate device, and/or a storage location for the message on the intermediate device. In another embodiment, the method includes deleting the message from the intermediate device in response to expiration of a predefined amount of time, receiving a cleanup command, and/or the recipient device accessing the message.

A program product includes a computer readable storage medium that stores code executable by a processor. The executable code includes code to perform determining that a recipient device for a message is unavailable to receive the message. The executable code includes code to perform sending the message to an intermediate device for storage until the recipient device is available to receive the message in response to determining that the recipient device is unavailable to receive the message. The executable code includes code to perform sending a notification to the recipient device that the message is available to access from the intermediate device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
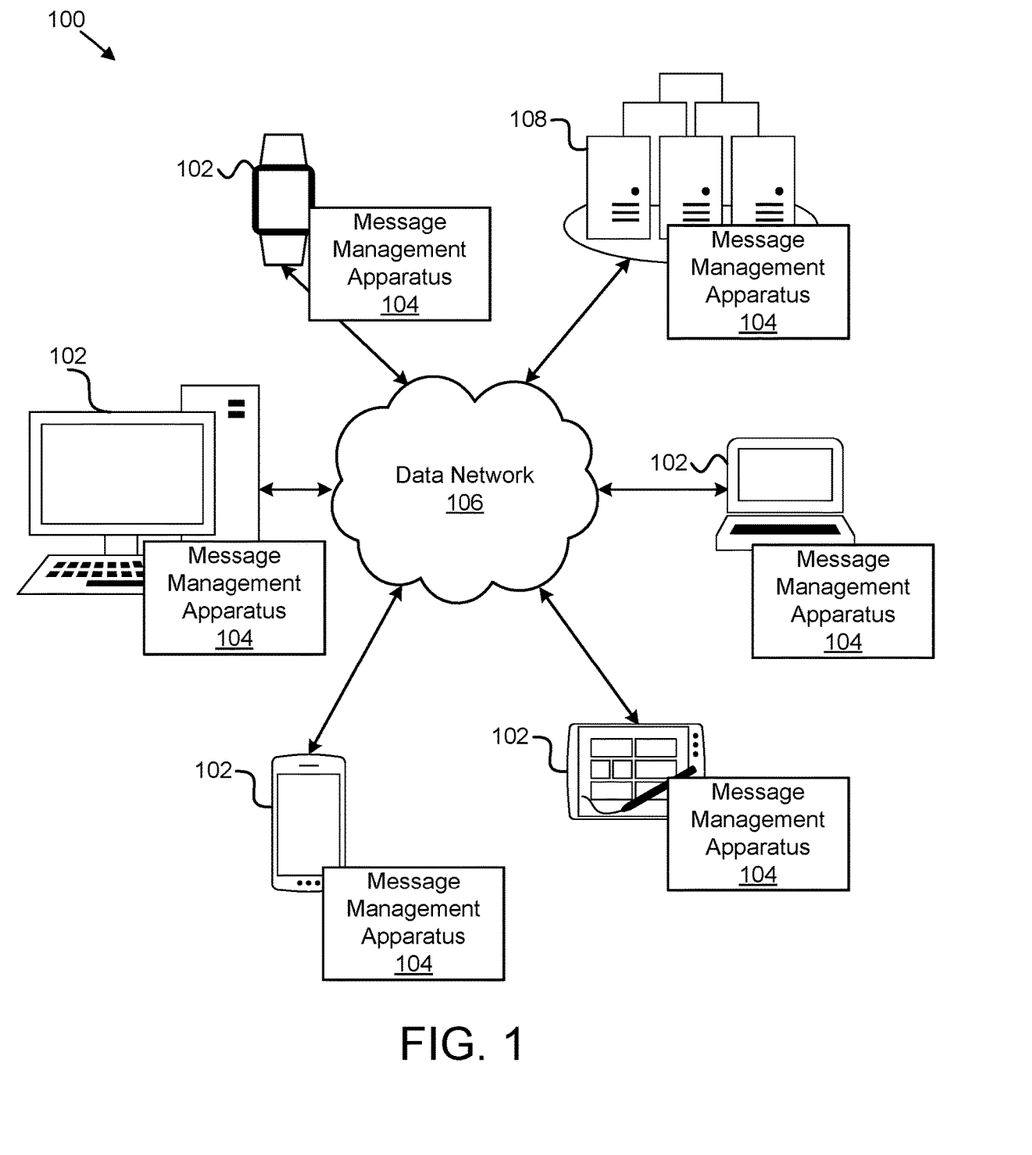
FIG. 1 is a schematic block diagram illustrating one embodiment of a system for sending messages to an unavailable device.

FIG. 1 is a schematic block diagram illustrating one embodiment of a system 100 for sending messages to an unavailable device. In one embodiment, the system 100 includes one or more information handling devices 102, one or more message management apparatuses 104, one or more data networks 106, and one or more servers 108. Even though a specific number of information handling devices 102, message management apparatuses 104, data networks 106, and servers 108 are depicted in FIG. 1, one of skill in the art will recognize, in light of this disclosure, that any number of information handling devices 102, message management apparatuses 104, data networks 106, and servers 108 may be included in the system 100 for sending messages to an unavailable device.

The system 100 includes one or more information handling devices 102. The information handling devices 102 may include a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108. The information handling devices 102 may be electrically coupled to a display (e.g., a touch-enabled display) to present content such as television content, movie content, game content, internet content, or the like.

In one embodiment, the message management apparatus 104 is configured to prevent deadlock in a system caused by attempting to send a message to an unavailable or unresponsive recipient device. In conventional systems, a sender device may send a message and wait until a confirmation response is received from the recipient device, or the sender device may repeatedly send the message until an acknowledgement message is receive by the sender device from the recipient device. Both of these situations may cause the sender device to deadlock, hang, wait, or the like, which may decrease the performance, usability, reliability, or the like, of the sender device and/or an entire computing system.

In one embodiment, the message management apparatus 104 improves the functionality and/or usability of the computer, the computing technology, the computing environment, or the like, by preventing deadlock in a system caused by attempting to send a message to an unavailable or unresponsive recipient device. For instance, the message management apparatus 104, in one embodiment, is configured to determine that a recipient device for a message is unavailable to receive the message. A recipient device may include an information handling device 102, such as a smart phone or laptop, a server 108, and/or the like. The message, in one embodiment, may be sent from a sender device, which may be embodied as an information handling device 102, such as a smart phone or laptop, a server 108, and/or the like. In certain embodiments, the message management apparatus 104 is configured to send the message to an intermediate device for storage until the recipient device is available to receive the message in response to determining that the recipient device is unavailable to receive the message.

The intermediate device may include a server 108, such as a remote or cloud server, or another information handling device 102 that is configured to receive, store, and/or transmit electronic messages. In a further embodiment, the message management apparatus 104 is configured to send a notification to the recipient device that the message is available to access from the intermediate device. The message management apparatus 104, including its various sub-modules, may be located on one or more information handling devices 102 in the system 100, one or more servers 108, one or more network devices, and/or the like. The message management apparatus 104 is described in more detail below with reference to FIGS. 2-4.

In various embodiments, the message management apparatus 104 may be embodied as a hardware appliance that can be installed or deployed on an information handling device 102, on a server 108, or elsewhere on the data network 106. In certain embodiments, the message management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using a high-definition multimedia interface ("HDMI") port, a DisplayPort port, a Mini DisplayPort port, a video graphics array ("VGA") port, a digital visual interface ("DVI") port, or the like); and/or the like. A hardware appliance of the message management apparatus 104 may include a power interface, a wired and/or wireless network interface, a graphical interface that attaches to a display, and/or a semiconductor integrated circuit device as described below, configured to perform the functions described herein with regard to the message management apparatus 104.

The message management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the message management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the message management apparatus 104.

The semiconductor integrated circuit device or other hardware appliance of the message management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the message management apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. The one or more servers 108 may be communicatively coupled (e.g., networked) over a data network 106 to one or more information handling devices 102. The one or more servers 108 may store data associated with an information handling device 102, with a user, with one or more applications, and/or the like, such as messages and message-related data sent between a sender device and a recipient device.

Figure 2:
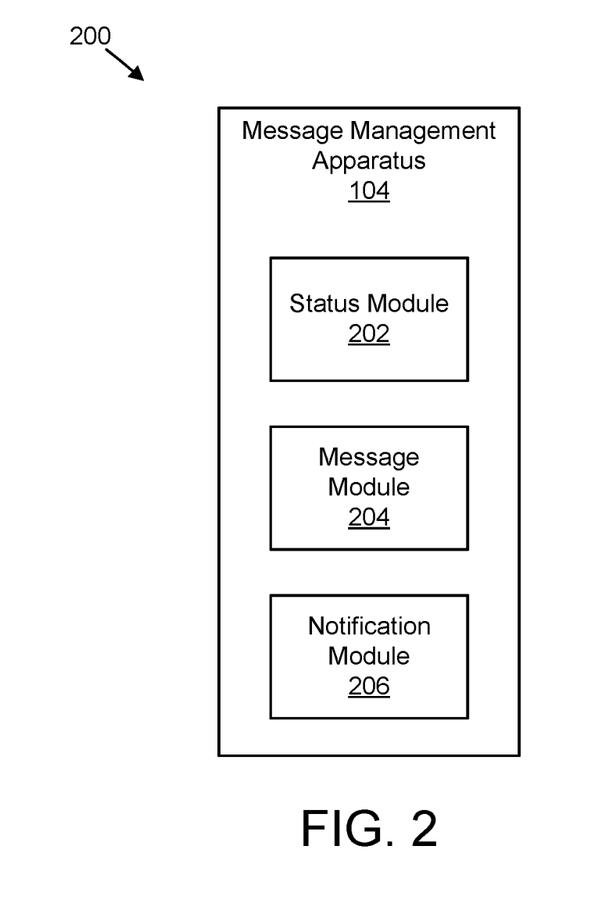
FIG. 2 is a schematic block diagram illustrating one embodiment of an apparatus for sending messages to an unavailable device.

FIG. 2 depicts one embodiment of an apparatus 200 for sending messages to an unavailable device. The apparatus 200 includes an embodiment of a message management apparatus 104 with a status module 202, a message module 204, and a notification module 206, which are described in more detail below.

The status module 202, in one embodiment, determines that a recipient device for a message is unavailable to receive the message. In one embodiment, the message is sent from a sender device to one or more recipient devices, which may be embodied as an information handling device 102 described above. A message may include an electronic message, such as an email, a text message, an instant message, or the like. A message may also include messages sent between devices, such as network status messages (e.g., handshaking messages, acknowledgement messages, etc.), device status messages, device health status messages, inter-process communications, application status messages, and/or the like.

In certain embodiments, the status module 202 determines that a recipient device is unavailable in response to the message module 204, described below, sending the message to the recipient device and not receiving a reply from the recipient device. For example, the sender device may send the message to the recipient device and may expect an acknowledgement message, a confirmation message, a read receipt message, or the like in return. If the message module 204 does not receive a reply message from the recipient device, the status module 202 may determine that the recipient device is unavailable, and will not receive the message. Accordingly, the status module 202 may trigger or notify the message module 204 to cancel sending the message to the recipient device.

In one embodiment, the status module 202 determines that a recipient device is unavailable based on one or more characteristics of the recipient device. For example, in some embodiments, the status module 202 may determine whether a utilization level for the recipient device satisfies a predetermined utilization threshold. As used herein, the utilization level for the recipient device may be a measure of the recipient device's usage of system resources such as the processor(s), memory, network, storage, or the like. The predetermined utilization level may be a threshold value, percentage, or the like representing a point where the recipient device is declared unavailable.

In one embodiment, the status module 202 queries the recipient device for one or more resource utilization measurements such as a current usage of a computer resource as a percentage of the total capacity of the resource. For example, the status module 202 may query the recipient device directly, a service or management application executing on the recipient device, or the like to determine the utilization levels of one or more resources of the recipient device. If the status module 202 determines that the utilization level satisfies the predetermined utilization threshold, meaning the utilization level equals and/or exceeds the predetermined utilization threshold, the status module 202 may determine that the recipient device as unavailable or unresponsive.

In a further embodiment, the status module 202 determines that the recipient device is unavailable in response to determining that a used capacity of a message buffer of the recipient device satisfies a predetermined buffer capacity. As used herein, a message buffer may be a data structure for storing messages awaiting to be processed. For example, if the total capacity of the message buffer for the recipient device is 100 MB, and the status module 202 determines that the message buffer is currently using 90 MB of message data, or is at a 90% capacity, the status module 202 may determine that the recipient device is unavailable if the used capacity equals or exceeds a predetermined buffer capacity threshold.

In one embodiment, the status module 202 determines that the recipient device is unavailable in response to determining that a health status of the recipient device satisfies a predetermined health threshold. A health status, as used herein, may be a measurement, quality, characteristic, or the like of the recipient device that indicates whether a resource has failed, or will fail, a temperature of the recipient device, a power status of the recipient device, and/or the like. For example, the status module 202 may determine that a recipient device is unavailable if the temperature of the recipient device is above a predetermined threshold temperature. In another example, the status module 202 may determine that a recipient device is unavailable if the recipient device has an unreliable power supply (e.g., if a remaining life of a battery power source for the recipient device is below a predetermined battery level).

In some embodiments, the status module 202 determines that a recipient device is unavailable based on a network status of the recipient device satisfying a predetermined network threshold. The network status of the recipient device may include a network connection speed between the sender and the recipient, a connection bandwidth between the sender and the recipient, and/or the like. For example, if the status module 202 determines that the connection speed between the sender device and the recipient device is below a threshold speed, the status module 202 may conclude that the recipient device is unavailable.

The status module 202, in one embodiment, determines one or more network characteristics associated with the recipient device by "pinging" the recipient device to determine if the recipient device is responsive, to determine the round-trip time for messages sent from the sender, and/or the like. In a further embodiment, the status module 202 may query the recipient device, a service running on the recipient device, a network device (e.g., a router, a switch, etc.), and/or the like to determine the network characteristics associated with the recipient device.

In certain embodiments, based on the network information that the status module 202 receives, the status module 202 may determine that the recipient device is unavailable to communicate with from the sender if a faster, more efficient, path or route to the recipient device exists. For example, if the status module 202 determines that a connection speed of a direct path between the sender and the recipient is 10 Gbps, while a connection speed of a path through an intermediate device is 100 Gbps, the status module 202 may consider the recipient device unavailable to send the message to directly from the sender device, which may instead send the message to the recipient device via an intermediate device.

In one embodiment, the message module 204 sends the message to an intermediate device for storage until the recipient device is available to receive the message. The intermediate device may be a device accessible to both the sender device and the recipient device. For example, the intermediate device may be a server 108 located in the cloud, on an intranet, at a different remote location, or the like, that is accessible to both the sender device and the recipient device.

The message module 204, in one embodiment, sends the message to the intermediate device in response to the status module 202 determining that the recipient device is unavailable or unresponsive. In such an embodiment, the message may be stored on the intermediate device until the recipient device becomes available to receive the message from the intermediate device. In this manner, instead of waiting for a recipient device to become available or responsive to receive a message sent from the sender device to the recipient device, the sender device can offload messages to the intermediate device, which the recipient device can access at a later point in time, and continue processing workloads.

The notification module 206, in one embodiment, sends a notification to the recipient device that the message is available to access from the intermediate device. The notification, in one embodiment, may include information that the recipient device uses to access the message on the intermediate device, such as the storage location where the message is stored on the intermediate device (e.g., a folder, a directory, a file path, etc.), the identity of the intermediate device (e.g., a name, an internet protocol ("IP") address, a media access control ("MAC") address, and/or the like), how long the message will be available/stored on the intermediate device, a location of the intermediate device, and/or the like.

The notification that the notification module 206 sends may have a smaller packet size than the message offloaded to the intermediate device. Furthermore, in some embodiments, the notification module 206 may not wait for a response from the recipient device in response to the notification so that the sender device can continue processing workloads without waiting for a reply from the recipient device. In some embodiments, the notification module 206 may send a notification to the recipient device using an execution thread that is separate from the main thread of execution on the sender device to prevent the sender device from becoming hung-up while it waits for a response to the notification.

In one embodiment, the notification module 206 sends a notification to the recipient device in periodic intervals. The notification module 206 may send a notification to notify the recipient device that a message is waiting for it on the intermediate device every second, every five seconds, or the like. In some embodiments, the notification module 206 periodically sends a notification to the recipient device until the recipient device downloads or receives the message from the intermediate device; until the notification module 206 receives a confirmation message from the recipient device that the message has been received; and/or until expiration of a period of time that the message is available on the intermediate device.

After receiving the notification, the message module 204 located on the recipient device may access the intermediate device using the provided storage location in the notification to download the message sent from the sender device. In some embodiments, the message module 204 periodically checks the intermediate device, e.g., a service executing on the intermediate device, to determine whether there are any messages stored that are intended for the recipient device. For example, the recipient device may query a service executing on the intermediate device, based on an identifier, or the like, of the recipient device, to determine whether there are any messages from a sender device to download. In this manner, the recipient device can be proactive about checking for messages intended for it instead of, or in addition to, receiving notifications from the sender device.

Figure 3:
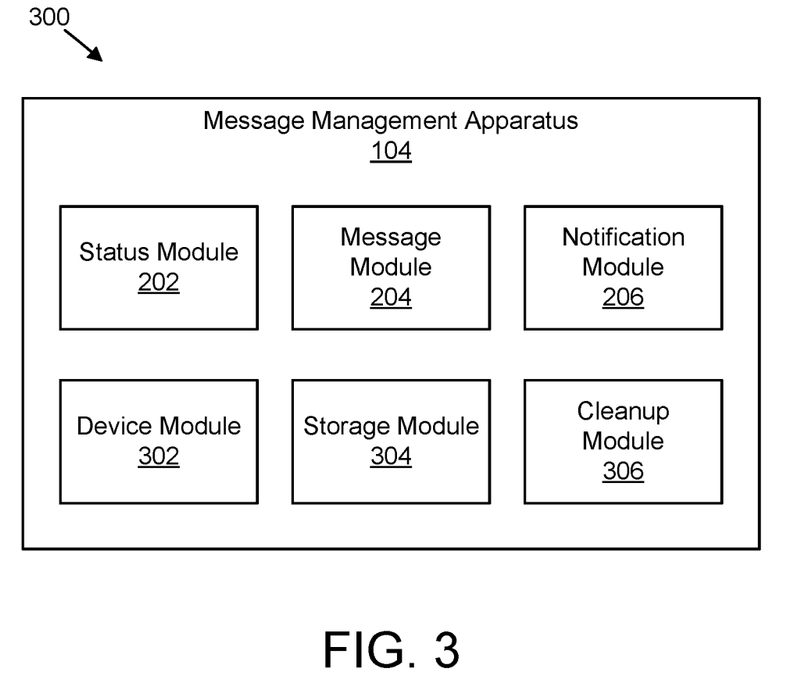
FIG. 3 is a schematic block diagram illustrating one embodiment of another apparatus for sending messages to an unavailable device.

FIG. 3 depicts one embodiment of an apparatus 300 for sending messages to an unavailable device. The apparatus 300 includes an embodiment of a message management apparatus 104 with a status module 202, a message module 204, and a notification module 206, which are substantially similar to the status module 202, the message module 204, and the notification module 206 described above with reference to FIG. 2. In further embodiments, the message management apparatus 104 includes a device module 302, a storage module 304, and/or a cleanup module 306, which are described in more detail below.

The device module 302, in one embodiment, selects the intermediate device that stores the message sent from the sender device for the recipient device. In one embodiment, the device module 302 selects the intermediate device from a list of predetermined intermediate devices that are each accessible to both the sender device and the recipient device. For example, the device module 302 may maintain a list, table, database, or the like of potential intermediate devices that may be used to store a message for a recipient device.

The intermediate devices on the list may be selected by a user, such as an IT or network administrator. The intermediate devices on the list may be discovered by the sender device. For example, the device module 302 on the sender device may map the network that the sender device is connected to determine one or more intermediate devices that have characteristics that meet predefined requirements for being an intermediate device, such as a number of hops between the sender device and the intermediate device, the hardware specifications of the intermediate device (e.g., storage capacity, network bandwidth/speed, etc.), and/or the like.

In a further embodiment, an intermediate device may broadcast on the network that it is available to be an intermediate device. For example, a device module 302 located on an intermediate device may send broadcast messages periodically to notify other devices on the network that it is available to act as an intermediate message storage device between a sender device and a recipient device. In certain embodiments, the device module 302 determines whether a potential intermediate device is configured to function as an intermediate device. For example, the device module 302 may determine whether a potential intermediate device has a service installed and/or running for receiving, storing, and transmitting messages to the recipient device.

The storage module 304, in one embodiment, stores the received message at a storage location on the intermediate device that is accessible to the recipient device. In one embodiment, the storage location is a directory of a file system used on the intermediate device. The storage module 304 may generate or determine a directory, folder, file path, or the like based on an identifier for the sender device or the recipient device such as an IP address, a MAC address, a device name, and/or the like. For example, the storage module 304 may create an entry based on the MAC address of the sender device or the recipient device. An example file path generated by the storage module 304 may be as follows: "/home/offload_AA:BB:CC:DD:EE:FF/".

In a further embodiment, the storage module 304 uses information included in one or more headers of the message. Header information, for example, may include an identifier of the recipient device and/or the sender device (e.g., a MAC address, an IP address, and/or the like). Based on the header information, the storage module 304 may generate a directory, or use a previously created directory, for storing the message when the message is received and the header information is parsed to identify storage location information.

In some embodiments, after the storage module 304 stores the message in the generated or determined storage location on the intermediate device, the storage module 304 may send the storage location/address to the notification module 206 so that the notification module 206 can include the storage location in the notification sent to the recipient device. For example, the notification may include an identifier for the intermediate device and a file path for the directory on the intermediate device where the message is stored so that the recipient device can download or access the message from the intermediate device when it is available.

The cleanup module 306, in one embodiment, deletes the message and/or the directory/folder/file path from the intermediate device in response to one or more cleanup conditions. The cleanup module 306, for example, may delete the message from the intermediate device in response to the recipient device accessing and/or downloading the message. In another example, the cleanup module 306 may delete the message from the intermediate device in response to expiration of a predefined amount of time (e.g., the message may have a time-to-live timer associated with it so that it "expires" after a period of time such as an hour, a day, a week, etc.). In a further example, the cleanup module 306, may delete the message from the intermediate device in response to receiving a cleanup command, signal, notification, or the like from the message module 204 on the sender device, on the recipient device, or the like.

Figure 4:
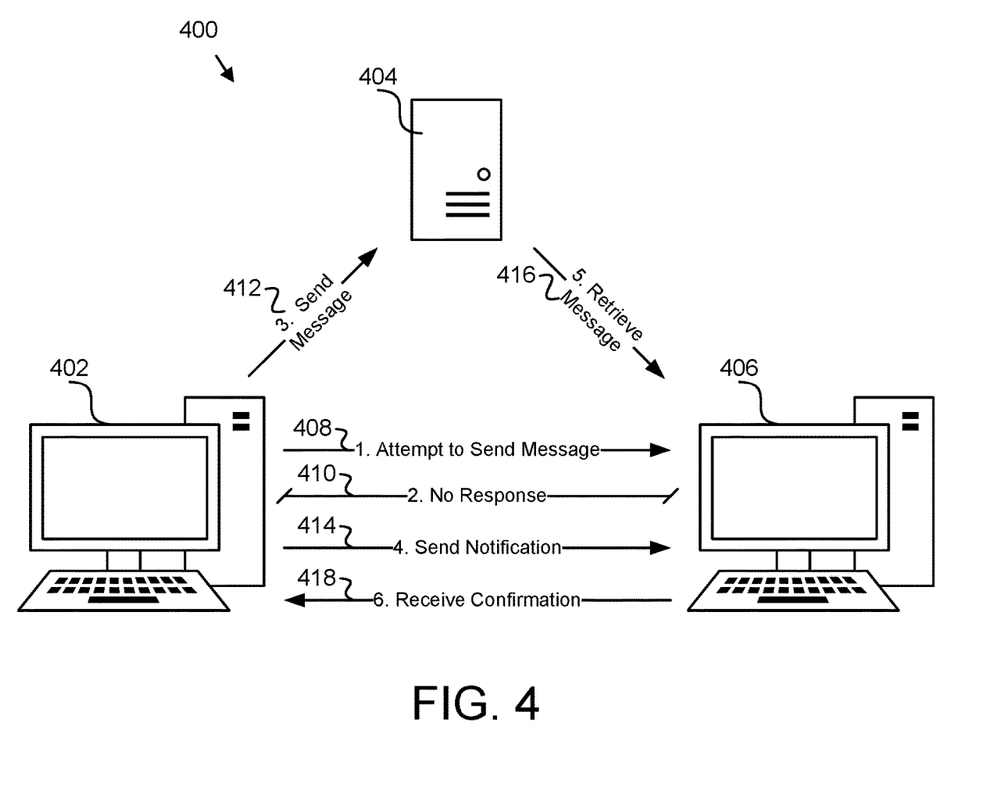
FIG. 4 is a schematic block diagram illustrating one embodiment of a system for sending messages to an unavailable device.

FIG. 4 depicts one embodiment of a system 400 for sending messages to an unavailable device. In one embodiment, the system 400 includes a sender device 402, an intermediate device 404, and a recipient device 406. In one embodiment, the message module 204 located on the sender device 402 attempts to send a message to the recipient device 406 (line 408). In some embodiments, if the status module 202 located on the sender device 402 determines that the recipient device 406 did not return a confirmation or acknowledgement message (line 410), then the status module 202 determines that the recipient device 406 is unavailable or unresponsive. Because the sender device 402 may have additional workloads to process, in certain embodiments, the message module 204 sends the message to the intermediate device 404 (line 412), which stores the message until the recipient device 406 becomes available to access and/or download the message from the intermediate device.

In one embodiment, after determining a storage location for the message on the intermediate device 404, the storage module 304 sends the storage location to the notification module 206. The notification module 206, in a further embodiment, sends a notification to the recipient device 406, for example, at periodic intervals (line 414) to notify the recipient device 406 that a message intended for the recipient device 406 is stored on the intermediate device at the provided storage location. A message module 204 located on the recipient device 406 retrieves the message from the intermediate device 404 (line 416), and sends a confirmation message to the sender device 402 (line 418) indicating that the message was successfully retrieved.

Figure 5:
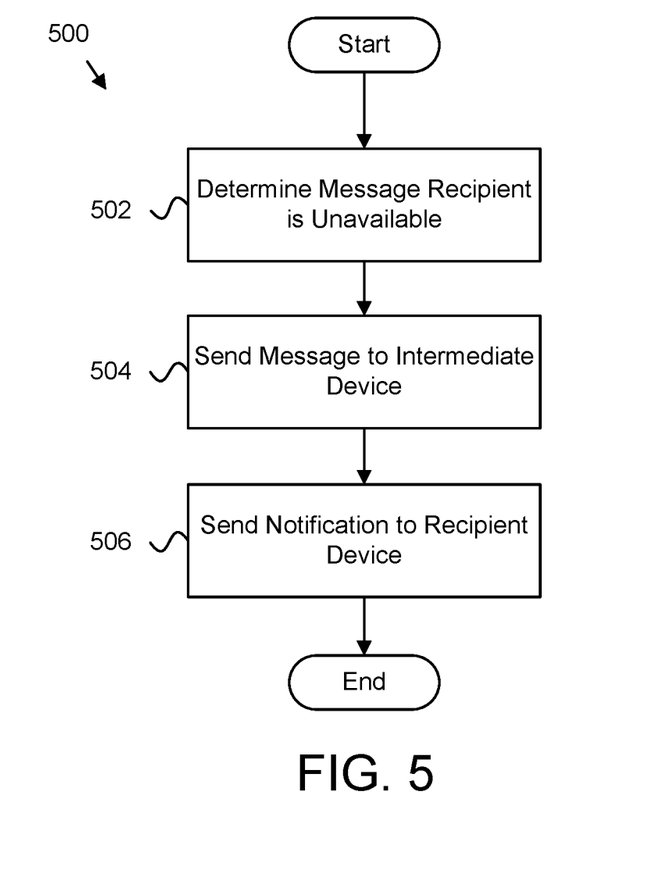
FIG. 5 is a schematic flow chart diagram illustrating one embodiment of a method for sending messages to an unavailable device.

FIG. 5 is a schematic flow chart diagram depicting one embodiment of a method 500 for sending messages to an unavailable device. The method 500 begins and determines 502 that a recipient device for a message is unavailable to receive the message. The method 500 sends 504 the message to an intermediate device for storage until the recipient device is available to receive the message in response to determining that the recipient device is unavailable to receive the message. The method 500 sends 506 a notification to the recipient device that the message is available to access from the intermediate device, and the method 500 ends. In one embodiment, the status module 202, the message module 204, and/or the notification module 206 perform the various steps of the method 500.

Figure 6:
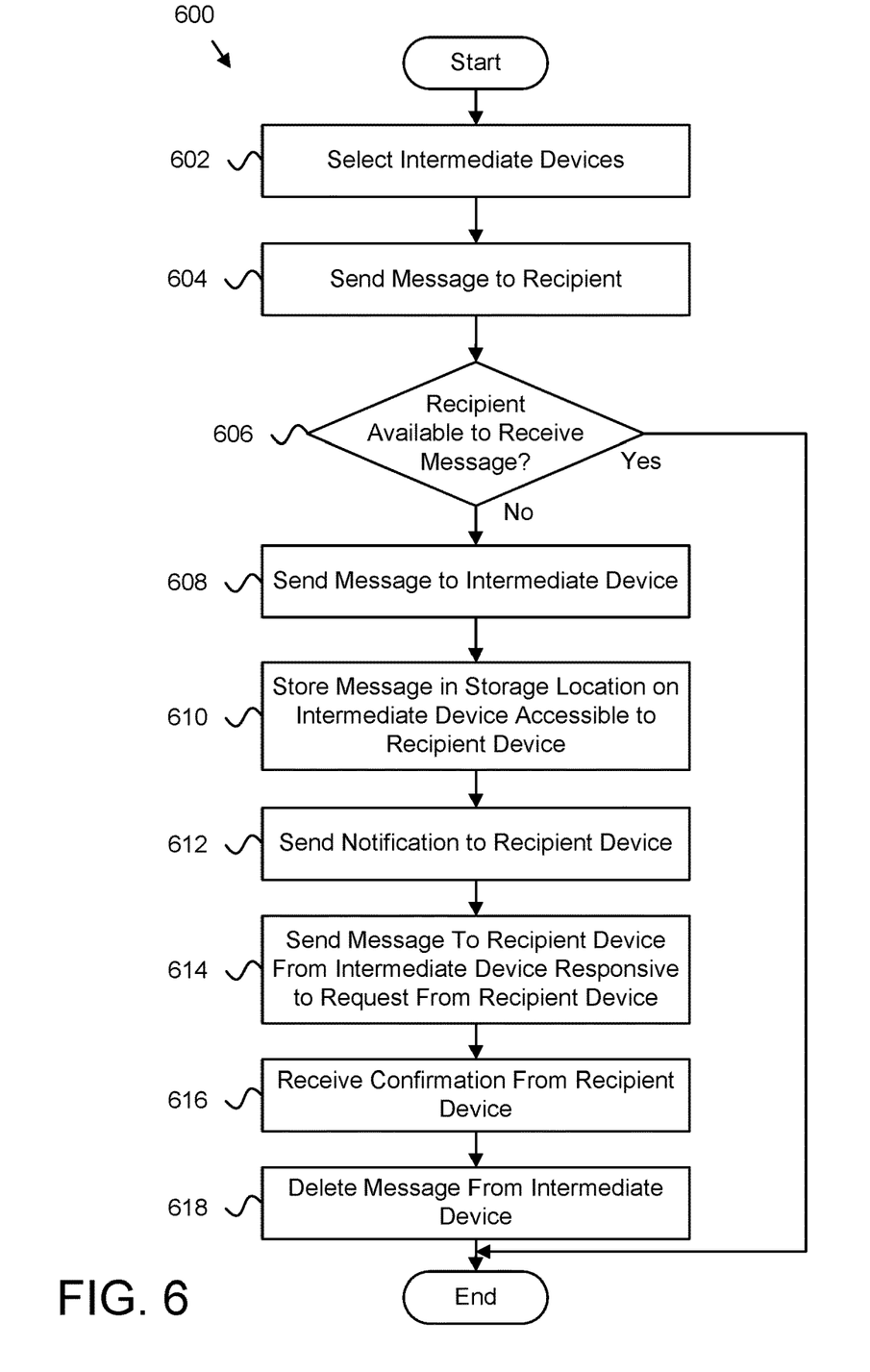
FIG. 6 is a schematic flow chart diagram illustrating one embodiment of another method for sending messages to an unavailable device.

FIG. 6 is a schematic flow chart diagram depicting one embodiment of a method 600 for sending messages to an unavailable device. The method 600 begins and, in one embodiment, selects 602 an intermediate device for storing messages intended for a recipient device. The method 600 sends 604 a message to a recipient device. The method 600 determines 606 whether the recipient device is available or responsive to receive the message. If so, then the method 600 ends.

Otherwise, if the recipient device is unavailable, the method 600 sends 608 the message to the intermediate device. The method 600, in a further embodiment, stores 610 the message in a storage location, such as a directory or folder, on the intermediate device that is accessible to the recipient device. The method 600 sends 612 a notification to the recipient device to indicate that a message intended for the recipient device is stored on the intermediate device at the determined storage location.

The method 600, in certain embodiments, sends 614 the stored message on the intermediate device from the intermediate device to the recipient device in response to a request from the recipient device. In one embodiment, the method 600 receives 616 a confirmation from the recipient device that the message has been successfully retrieved from the intermediate device. The method 600, in various embodiments, deletes 618 the message from the intermediate device, and the method 600 ends. In some embodiments, the status module 202, the message module 204, the notification module 206, the device module 302, the storage module 304, and the cleanup module 306 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a message generator on a sender device that generates a message for transmission to a recipient device;
   a status module on the sender device that determines, via directly querying the recipient device, whether the recipient device for the message is available or unavailable to receive the message from the sender device that generated the message;
   a message module on the sender device that sends the message to an intermediate device for storage until the recipient device is available to retrieve the message from the intermediate device in response to determining that the recipient device is unavailable to receive the message from the sender device at a time when the message is being transmitted from the sender device to the recipient device; and a notification module on the sender device that sends a notification to the recipient device that the message generated by the sender device is available for retrieval from the intermediate device in response to the message module sending the message to the intermediate device, wherein the sender device, the intermediate device, and the recipient device are different devices, and wherein the message generator, the status module, the message module and the notification module comprise one or more of hardware circuits, a programmable hardware device and a processor executing code.

2. The apparatus of claim 1, wherein the status module determines that the recipient device is unavailable in response to sending the message to the recipient device and not receiving a reply.

3. The apparatus of claim 1 wherein the status module determines that the recipient device is unavailable based on one or more characteristics of the recipient device, the one or more characteristics comprising:
a utilization level of the recipient device satisfying a predetermined utilization threshold;
a used capacity of a message buffer of the recipient device satisfying a predetermined buffer capacity;
a health status of the recipient device satisfying predetermined health threshold; and
a network status of the recipient device satisfying a predetermined network threshold.

4. The apparatus of claim 1, wherein the status module determines that the recipient device is unavailable to receive the message in response to determining that a network connection to the intermediate device is faster than a network connection to the recipient device.

5. The apparatus of claim 1, further comprising a device module that selects the intermediate device in response to one or more of:
determining that a service for receiving, storing, and transmitting messages to the recipient device is available on the intermediate device;
determining that one or more characteristics of the intermediate device satisfies one or more predefined requirements; and
determining that the intermediate device is on a list of predetermined intermediate devices.

6. The apparatus of claim 1, further comprising a storage module that stores the received message in a storage location on the intermediate device that is accessible to the recipient device.

7. The apparatus of claim 1, wherein the notification module periodically sends the notification to the recipient device at predetermined intervals while the message is available to access from the intermediate device.

8. The apparatus of claim 1, wherein the notification comprises one or more of a location of the intermediate device, an identifier for the intermediate device, and a storage location for the message on the intermediate device.

9. The apparatus of claim 1, further comprising a cleanup module that deletes the message from the intermediate device in response to:
expiration of a predefined amount of time;
receiving a cleanup command; and
the recipient device accessing the message.

10. A method comprising:
generating, at a sender device, a message for transmission to a recipient device;
determining, at the sender device via directly querying the recipient device, whether the recipient device for the message is available or unavailable to receive the message from the sender device that generated the message;
sending, from the sender device, the message to an intermediate device for storage until the recipient device is available to retrieve the message from the intermediate device in response to determining that the recipient device is unavailable to receive the message from the sender device at a time when the message is being transmitted from the sender device to the recipient device; and
sending, from the sender device, a notification to the recipient device that the message generated by the sender device is available for retrieval from the intermediate device in response to sending the message to the intermediate device,
wherein the sender device, the intermediate device, and the recipient device are different devices.

11. The method of claim 10, wherein determining that the recipient device is unavailable comprises sending the message to the recipient device and not receiving a reply.

12. The method of claim 10, further comprising determining that the recipient device is unavailable based on one or more characteristics of the recipient device, the one or more characteristics comprising:
a utilization level of the recipient device satisfying a predetermined utilization threshold;
a used capacity of a message buffer of the recipient device satisfying a predetermined buffer capacity;
a health status of the recipient device satisfying predetermined health threshold; and
a network status of the recipient device satisfying a predetermined network threshold.

13. The method of claim 10, further comprising determining that the recipient device is unavailable to receive the message in response to determining that a network connection to the intermediate device is faster than a network connection to the recipient device.

14. The method of claim 10, further comprising selecting the intermediate device in response to one or more of:
determining that a service for receiving, storing, and transmitting messages to the recipient device is available on the intermediate device;
determining that one or more characteristics of the intermediate device satisfies one or more predefined requirements; and
determining that the intermediate device is on a list of predetermined intermediate device.

15. The method of claim 10, further comprising storing the received message in a storage location on the intermediate device that is accessible to the recipient device, the storage location comprising a directory, the directory determined based on one or more of:
a unique identifier for a device that the message is sent from; and
information included in one or more headers of the message.

16. The method of claim 10, further comprising periodically sending the notification to the recipient device at predetermined intervals while the message is available to access from the intermediate device.

17. The method of claim 10, wherein the notification comprises one or more of a location of the intermediate device, an identifier for the intermediate device, and a storage location for the message on the intermediate device.

18. A program product comprising a non-transitory computer readable storage medium that stores code executable by a processor, the executable code comprising code to perform:
- generating, at a sender device, a message for transmission to a recipient device;
- determining, at the sender device, that the recipient device for the message is available or unavailable to receive the message generated by the sender device, wherein the sender device directly queries the recipient device to determine if the recipient device is available to receive the message;
- sending, from the sender device, the message generated by the sender device to an intermediate device for storage until the recipient device is available to retrieve the message generated by the sender device from the intermediate device in response to determining that the recipient device is unavailable to receive the message from the sender device at a time when the message is being transmitted from the sender device to the recipient device; and
- sending, from the sender device, a notification to the recipient device that the message generated by the sender device is available for retrieval from the intermediate device in response to sending the message to the intermediate device,
- wherein the sender device, the intermediate device, and the recipient device are different devices.

* * * * *